United States Patent
Nakatake et al.

(10) Patent No.: US 9,203,270 B2
(45) Date of Patent: Dec. 1, 2015

(54) STATOR CORE WITH VARIED LAMINATION SHAPES AND SIZES TO REDUCE WIRE INSULATION STRESS

(71) Applicant: SANYO DENKI CO., LTD., Tokyo (JP)

(72) Inventors: Kouji Nakatake, Tokyo (JP); Masaaki Ohashi, Tokyo (JP); Zhang Hong, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 250 days.

(21) Appl. No.: 13/712,044

(22) Filed: Dec. 12, 2012

(65) Prior Publication Data

US 2013/0154435 A1    Jun. 20, 2013

(30) Foreign Application Priority Data

Dec. 14, 2011  (JP) .................................. 2011-273260

(51) Int. Cl.
*H02K 1/06* (2006.01)
*H02K 1/14* (2006.01)
(Continued)

(52) U.S. Cl.
CPC .. *H02K 1/06* (2013.01); *H02K 1/08* (2013.01); *H02K 1/14* (2013.01); *H02K 1/146* (2013.01); *H02K 1/148* (2013.01); *H02K 1/18* (2013.01)

(58) Field of Classification Search
CPC ......... H02K 1/08; H02K 1/146; H02K 1/148; H02K 1/12; H02K 1/14; H02K 1/165; H02K 1/16
USPC ............ 310/216.18, 216.01, 216.04, 216.61, 310/216.55, 216.57, 216.96, 216.19, 310/216.16, 194, 65, 216.15
See application file for complete search history.

(56) References Cited

U.S. PATENT DOCUMENTS 6,157,109 A * 12/2000 Schiferl et al. ......... 310/216.019
2007/0013255 A1 * 1/2007 Wakitani et al. .............. 310/216
(Continued)

FOREIGN PATENT DOCUMENTS

JP    2003259591 A    9/2003
JP    2009-044799 A    2/2009
(Continued)

OTHER PUBLICATIONS

Masayoshi Hirota, Stator, Feb. 19, 2009, Sumitomo Electric Industries, English Machine Translation (JP2009038904).*

(Continued)

*Primary Examiner* — Terrance Kenerly
*Assistant Examiner* — Alexander Singh
(74) *Attorney, Agent, or Firm* — Novak Druce Connolly Bove + Quigg LLP

(57) ABSTRACT

A stator is provided. The stator includes a yoke part of an annular shape, tooth winding portions that protrude inward from the yoke part and around which an electric wire is wound, and a tooth end portion formed on an inward side of the tooth winding portion. The stator is formed by stacking steel plates in a direction corresponding to a rotational axis of a motor. The tooth winding portion is formed by stacking the steel plates having different shapes such that at an end portion in the stacking direction, thickness of the tooth winding portions gradually decrease toward the end portion in the stacking direction, and the yoke part and the tooth end portion include protruding portions formed by stacking the steel plates, such that the protruding portions protrude from the tooth winding portion in the stacking direction.

3 Claims, 6 Drawing Sheets

(51) Int. Cl.
*H02K 1/18* (2006.01)
*H02K 1/08* (2006.01)

(56) References Cited

U.S. PATENT DOCUMENTS

| | | | |
|---|---|---|---|
| 2009/0026873 A1* | 1/2009 | Matsuo et al. | 310/216 |
| 2010/0289375 A1 | 11/2010 | Horng et al. | |
| 2011/0127876 A1* | 6/2011 | Hasuo et al. | 310/216.004 |

FOREIGN PATENT DOCUMENTS

| | | | |
|---|---|---|---|
| JP | 2009038904 A | * | 2/2009 |
| JP | 2009232538 A | | 10/2009 |
| JP | 2009232538 A | * | 10/2009 |
| JP | 2010130842 A | | 6/2010 |
| JP | 2010279241 A | | 12/2010 |
| WO | WO 2009057674 A1 | * | 5/2009 |
| WO | WO 2010146175 A2 | * | 12/2010 |
| WO | WO 2013084614 A1 | * | 6/2014 |

OTHER PUBLICATIONS

Morishita Honko, Stator for Capacitor Motors, Oct. 8, 2009, Panasonic Corp., JP2009232538.*
Notice of Reason for Refusal for Japanese Patent Application No. 2011-273260 mailed on Jan. 27, 2015.
European Search Report issued on Jun. 23, 2015 for the corresponding European Patent Application No. 12196739.2 (7 pages).
Chinese Office Action issued on Jul. 17, 2015 for the corresponding Chinese Patent Application No. 201210535867.8 (4 pages).

* cited by examiner

STATOR CORE WITH VARIED LAMINATION SHAPES AND SIZES TO REDUCE WIRE INSULATION STRESS

CROSS-REFERENCE TO RELATED APPLICATIONS

This application claims benefit, under 35 U.S.C. §119(e), to Japanese Application No. 2011-273260, filed Dec. 14, 2011, the entirety of which is incorporated herein by reference.

BACKGROUND

1. Technical Field

The present invention relates to a stator provided in an electric motor.

Usually, a stator provided in an electric motor is formed by stacking plural steel plates, and includes teeth for winding of an electric wire. Since it is necessary to maintain a state that the electric wire is insulated from the stator, a stator described in Japanese Patent Application Laid-open No. 2010-279241, for example, is coated with an insulating member made of resin at a portion contacting with the electric wire such that the electric wire does not directly contact with the stator.

However, attaching the insulating member to the stator requires a process for manufacturing a resinous insulating member of a shape corresponding to a shape of the tooth portion of the stator, and coating the tooth portion with the insulating member. Such work takes time. Furthermore, providing the insulating member narrows and limits a region for winding of the electric wire. As a result, winding efficiency is reduced. In addition, providing the insulating member between the stator and the electric wire makes it difficult for heat to transmit to the stator from the electric wire through which a current flows to generate heat. As a result, heat radiation performance is degraded.

SUMMARY

In order to solve the problems existing in the above-described background, the present invention has been made. It is an object of the present invention to provide a stator that suppresses degradation in insulating performance and pressure-resisting performance without providing an additional insulating member, that can shorten a work time, and that can improve not only winding efficiency but also heat radiation performance.

A stator to attain the above-described object includes an annular part of an annular shape, a plurality of tooth winding portions that protrude in an inward direction from the annular part and around which an electric wire is wound, and a tooth end portion formed on an inward side of the tooth winding portion, and the stator is formed by stacking a plurality of steel plates in a stacking direction corresponding to a rotational axis of an electric motor. The tooth winding portion is formed by stacking a plurality of the steel plates having shapes different from one another such that at an end portion of steel plates in the stacking direction, thicknesses of the tooth winding portions gradually decrease toward the end portion in the stacking direction, and the annular part and the tooth end portion each include a protruding portion formed by stacking a plurality of the steel plates such that the protruding portion protrudes from the tooth winding portion in the stacking direction.

The objects, features, and characteristics of this invention other than those set forth above will become apparent from the description given herein below with reference to preferred embodiments illustrated in the accompanying drawings.

DETAILED DESCRIPTION

Figure 1:
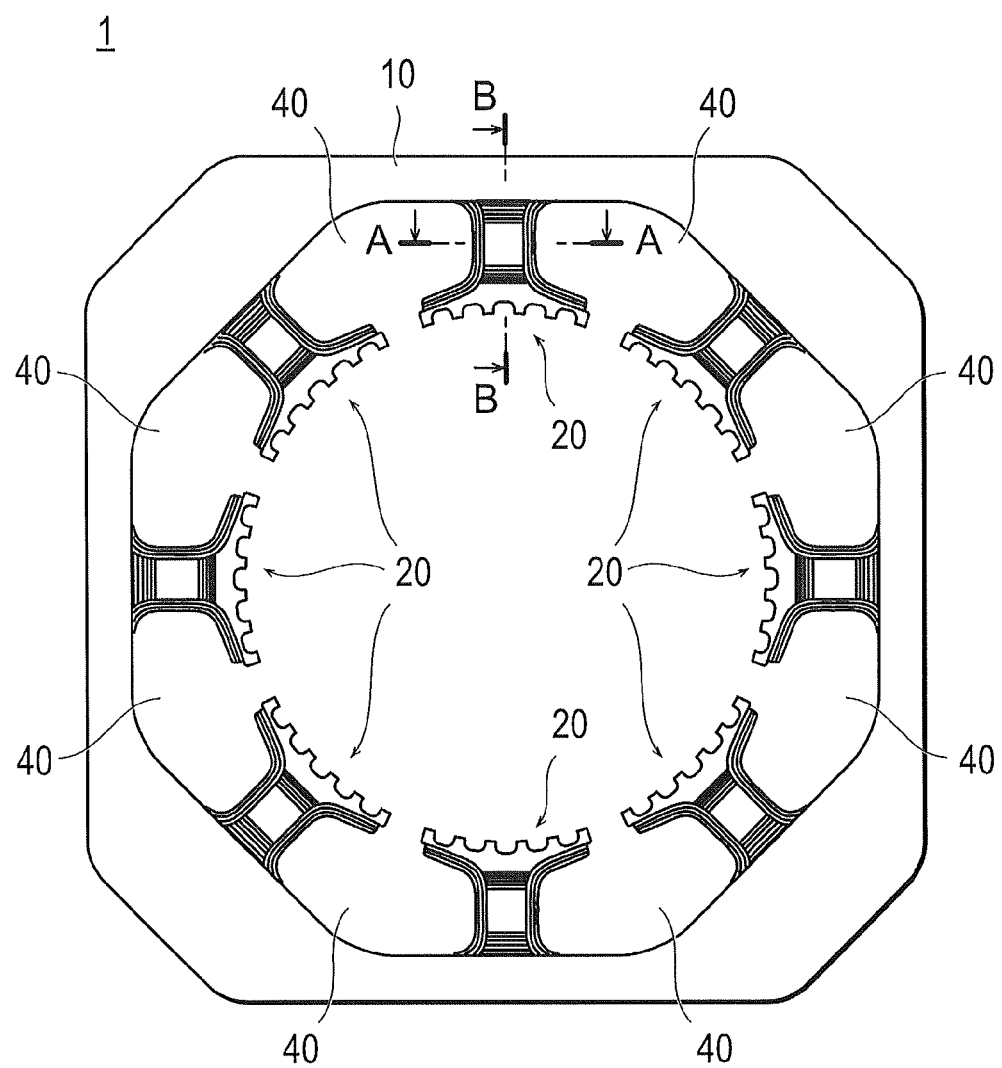
FIG. 1 is a plan view illustrating a stator according to an embodiment.

In the following, embodiments of the present invention will be described with reference to the drawings. In the description for the drawings, the same reference numeral is attached to the same element, and the overlapping description will be omitted.

Figure 2:
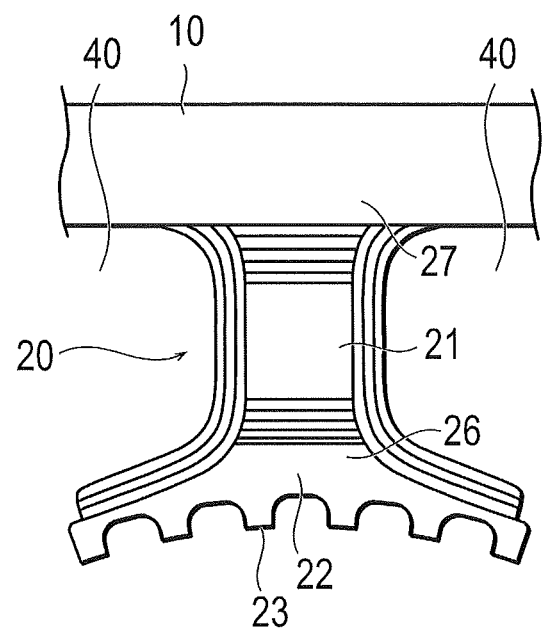
FIG. 2 is an enlarged plan view illustrating one tooth portion of the stator.

A stator 1 according to the present embodiment is formed by stacking a plurality of steel plates, and fixing the steel plates to one another by means of an adhesive, caulking or the like. As illustrated in FIGS. 1 and 2, the stator 1 includes an annular yoke part 10 (annular part), and a plurality of tooth parts 20 protruding from the yoke part 10 in the inward direction. In the present specification, the expression "inward direction" means a radial inward direction of the annular yoke part 10, the expression "outward direction" means a radial outward direction of the yoke part 10, the expression "circumferential direction" means a direction in which the yoke part 10 annularly extends (direction in which a plurality of tooth parts 20 are arranged), and the expression "stacking direction" means a direction (corresponding to a rotational axis of an electric motor) in which the steel plates are stacked.

The tooth part 20 is a part around which an electric wire 30 is wound. A plurality of the tooth parts 20 are arranged in the circumferential direction. At each position between the tooth parts 20, a slot 40 is formed, the slot being a gap for accommodating the electric wire 30 wound around the tooth part 20.

Each tooth part 20 includes a tooth winding portion 121 around which the electric wire 30 is actually wound, and a tooth end portion 22 formed on the inward side of the tooth winding portion 121. The tooth end portion 22 is formed so as to extend, from the tooth winding portion 121, in the both direction toward the neighboring other tooth parts 20. On the inward side of the tooth end portion 22, there is formed an arc-shaped gap surface 23 that faces a rotor (not illustrated) when the electric motor is configured.

Figure 3:
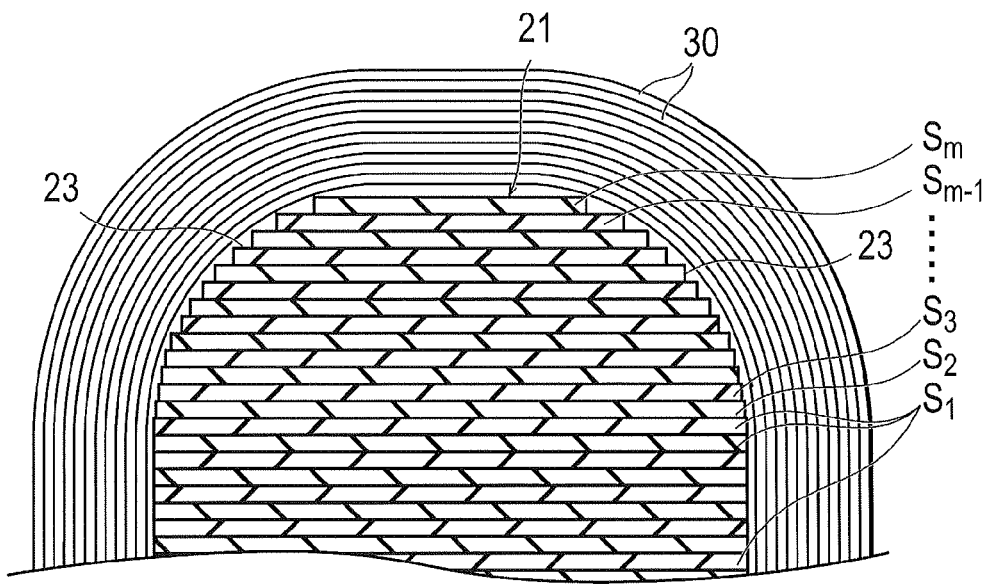
FIG. 3 is a sectional view along the A-A line in FIG. 1 with an electric wire having been wound around the stator.
Figure 5:
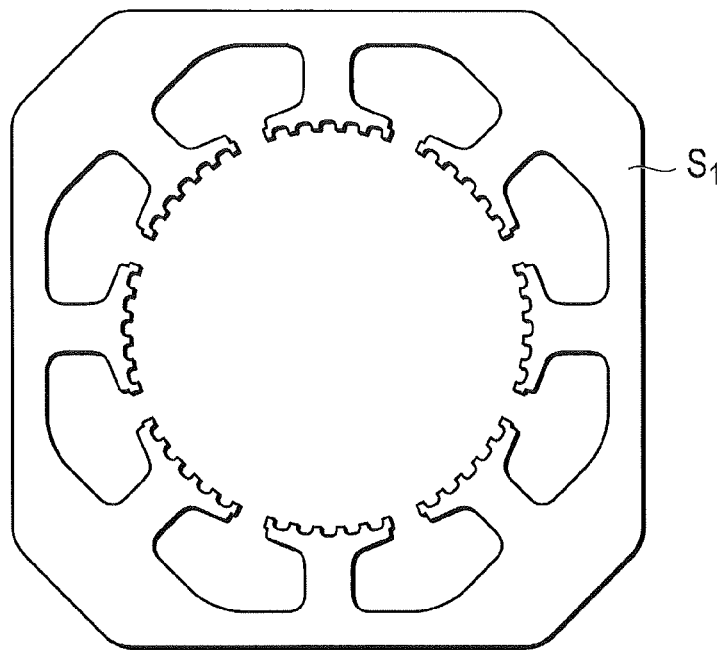
FIG. 5 is a plan view illustrating one steel plate that constitutes the stator.
Figure 6:
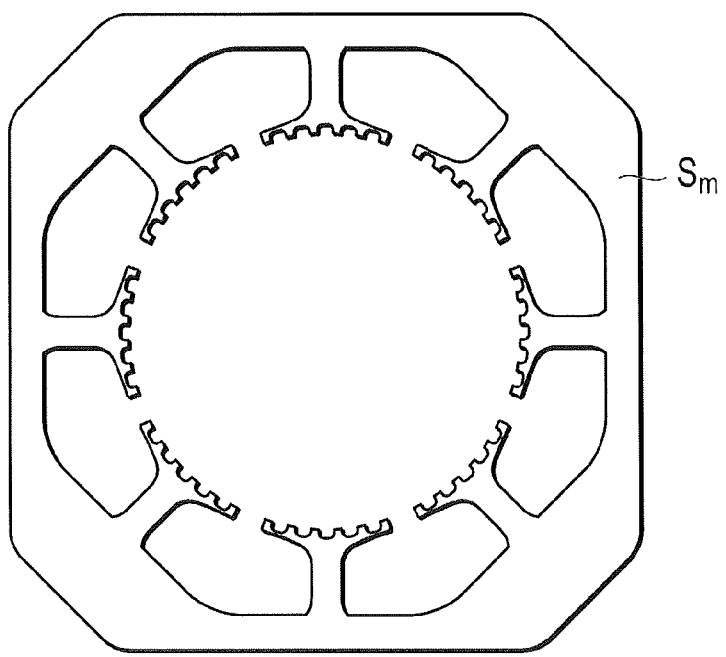
FIG. 6 is a plan view illustrating one steel plate that constitutes the stator.

As illustrated in FIG. 3, the tooth winding portion 121 is formed such that at the end portion in the stacking direction, a thickness of the tooth winding portion 121 in the circumferential direction gradually decreases toward the end. The shape of the tooth winding portion 121 is formed by a plurality of steel plates $S_1$, and a plurality of steel plates $S_2$ to $S_m$. The steel plates $S_1$ have the same shape, and are stacked in a set range at the center location in the stacking direction. The steel plates $S_2$ to $S_m$ are arranged (on the upper side in FIG. 3) at the more end location in the stacking direction than the location of the steel plates $S_1$, and thicknesses of the tooth winding portion 121 in the steel plates $S_2$ to $S_m$ gradually decrease in the circumferential direction. FIG. 5 illustrates the steel plate $S_1$, and FIG. 6 illustrates the steel plate $S_m$. A plurality of the steel plates $S_2$ to $S_m$ in which the thicknesses of the tooth winding portion 121 gradually decrease in the circumferential direction are stacked such that the tooth winding portion 121 has a curved-surface portion 23 at the end portion in the stacking direction. FIG. 3 illustrates the end portion only on the one side in the stacking direction, the configuration of the other side has the plane-symmetrical relation with that of the one side, and the description of the other side is omitted for avoiding the overlapping.

Figure 4:
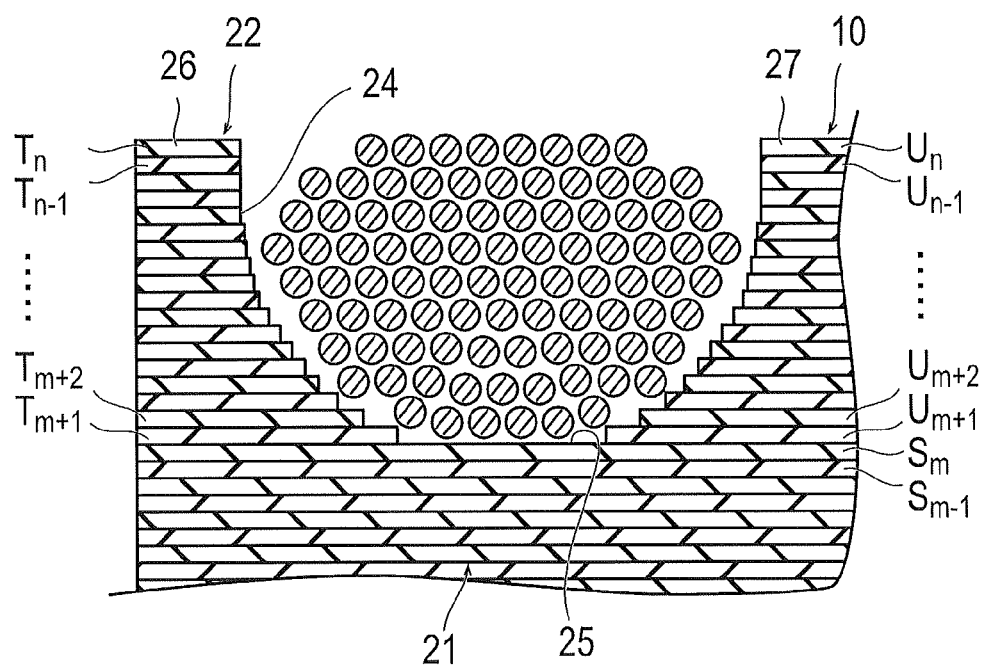
FIG. 4 is a sectional view along the B-B line in FIG. 1 with the electric wire having been wound around the stator.
Figure 7:
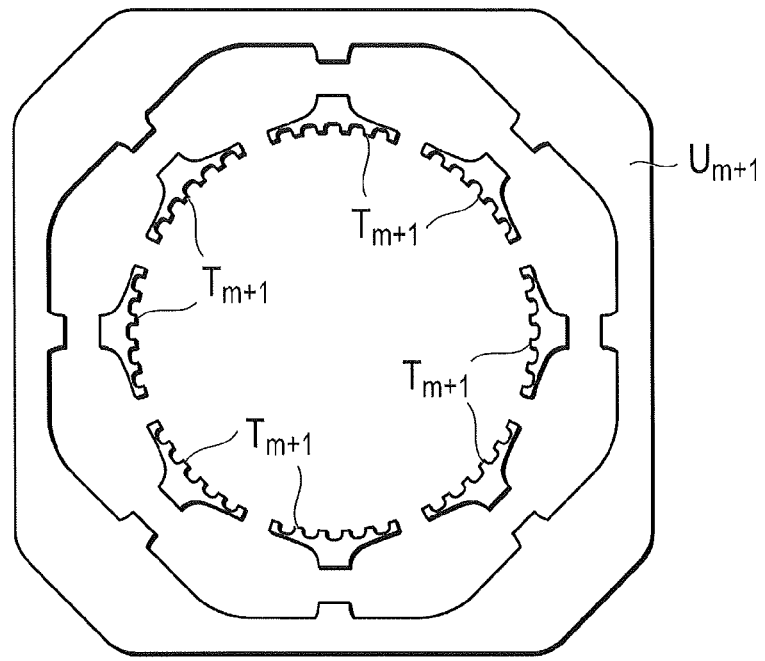
FIG. 7 is a plan view illustrating inside steel plates and one outside steel plate.
Figure 8:
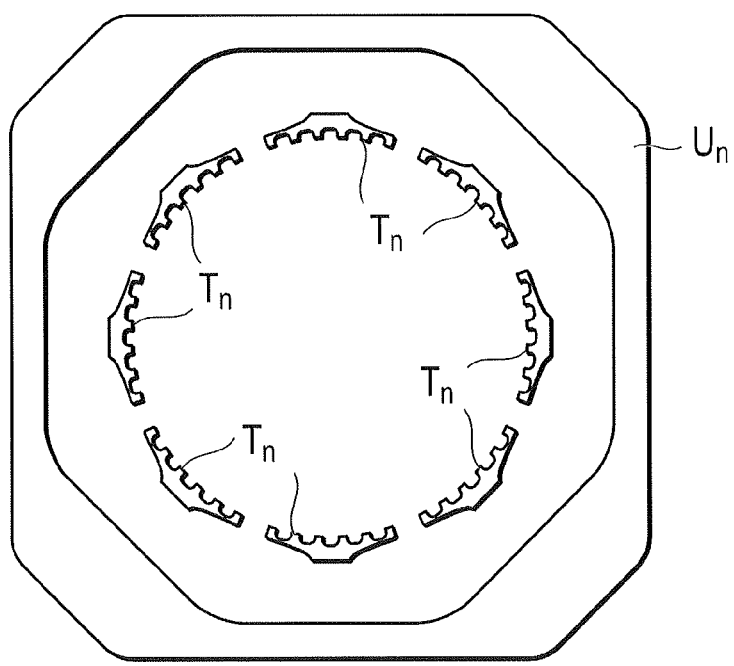
FIG. 8 is a plan view illustrating inside steel plates and one outside steel plate.

As illustrated in FIG. 4, the tooth end portion 22, the tooth winding portion 121 and the yoke part 10 form a concave holding portion 24 that gradually widens toward an end in the stacking direction on the section in the inward and outward directions (radial direction). The concave shape of the holding portion 24 is preferably a smooth curved surface. The shape of the holding portion 24 is formed by an inside protruding portion 26 (protruding portion) and an outside protruding portion 27 (protruding portion). The inside protruding portion 26 is positioned on the side of the tooth end portion 22, and protrudes in the stacking direction from an bottom portion 25 of the holding portion 24. The outside protruding portion 27 is positioned on the side of the yoke part 10, and protrudes in the stacking direction from the bottom portion 25 of the holding portion 24. The inside protruding portion 26 is formed by stacking inside steel plates $T_{m+1}$ to $T_n$, the thickness of which in the inward and outward directions gradually decrease toward, the end in the stacking direction. The outside protruding portion 27 is formed by stacking outside steel plates $U_{m+1}$ to $U_n$, the thickness of which in the inward and outward directions gradually decrease toward the end in the stacking direction. FIG. 7 illustrates the inside steel plates $T_{m+1}$ and the outside steel plate $U_{m+1}$, being placed on the steel plate $S_m$ that forms the bottom portion 25 of the holding portion 24. FIG. 8 illustrates the inside steel plates $T_n$ and the outside steel plate $U_n$, being arranged at the most end position.

The stator 1 according to the present embodiment is formed by stacking a plurality of steel plates $S_2$ to $S_m$ having the shapes different from one another such that at the end portion in the stacking direction, the thickness of the tooth winding portion 121 gradually decreases toward the end in the stacking direction. Accordingly, an angular portion is not formed at the location where the electric wire 30 is wound, or the angular portion has the less angular to inhibit the electric wire 30 from being pushed into the angular portion. For this reason, it is possible to suppress degradation in the insulating performance and the pressure-resisting performance in the electric wire 30 and the stator 1. As a result, the necessity of coating the tooth part 20 with an additional insulating member can be eliminated, and the largest possible region for accommodating the electric wire 30 can be secured to improve the winding efficiency of the wound electric wire 30, so that an electric motor can be downsized or outputs higher power. Furthermore, the additional insulating member is not necessary so that tight contact between the electric wire 30 and the stator 1 can improve the heat radiation performance. In addition, it becomes unnecessary to coat the stator 1 with the additional insulating member so that work efficiency can be improved to promote faster production of the stator 1.

Changing a shape of the stator 1 causes a change in a shape of the insulating member, and the different member is required depending on a type of the stator 1. On the contrary, according to the present embodiment, the necessity of coating the stator 1 with the additional insulating member is eliminated, so that the necessity of preparing the insulating members of a plurality of shapes is eliminated and it makes possible to reduce the number of the components and the cost.

Coating the stator 1 with the additional insulating member causes a gap of the slot 40 to be narrowed due to a thickness of the insulating member. Accordingly, a nozzle used for winding the electric wire 30 around the tooth portion 20 is made thin. For this reason, the electric wire 30 that is made to pass through the nozzle is limited to a wire having a small diameter, so that a selection range for a diameter of the electric wire becomes narrow. On the contrary, according to the present embodiment, there is no necessity of coating the stator 1 with the additional insulating member so that a nozzle having a larger diameter can be used. As a result, the selection range for a diameter of the electric wire becomes wider, and for example, it becomes possible to wind the thick electric wire 30 that enables a large current to flow.

The yoke part 10 and the tooth end portion 22 have the inside protruding portion 26 and the outside protruding portion 27 that are formed by stacking a plurality of steel plates $T_{m+1}$ to $T_n$ and a plurality of steel plates $U_{m+1}$ to $U_n$ such that the protruding portions and 27 protrude from the tooth winding portion 121 in the direction of stacking the steel plates. Accordingly, without providing an additional member, the structure itself of the stator 1 can hold the electric wire 30 well such that the electric wire 30 is not displaced from the location where the electric wire 30 has been wound.

Further, the inside protruding portion 26 and the outside protruding portion 27 are formed such that the thickness of the protruding portions 26 and 27 gradually decrease toward the end in the direction of stacking the steel plates. Accordingly, the inclined surfaces of the inside protruding portion 26 and the outside protruding portion 27 can hold the electric wire 30 so that degradation in the insulating performance and the pressure-resisting performance in the electric wire 30 and the stator 1 can be suppressed.

The steel plates used for the inside protruding portion 26 and the outside protruding portion 27 include the inside steel plates $T_{m+1}$ to $T_n$ provided at the tooth end portion 22, and the outside steel plates $U_{m+1}$ to $U_n$ provided at the yoke 10. Accordingly, the two protruding portions 26 and 27 that sandwiches the tooth winding portion 121 are easily formed by stacking the steel plates.

Figure 9:
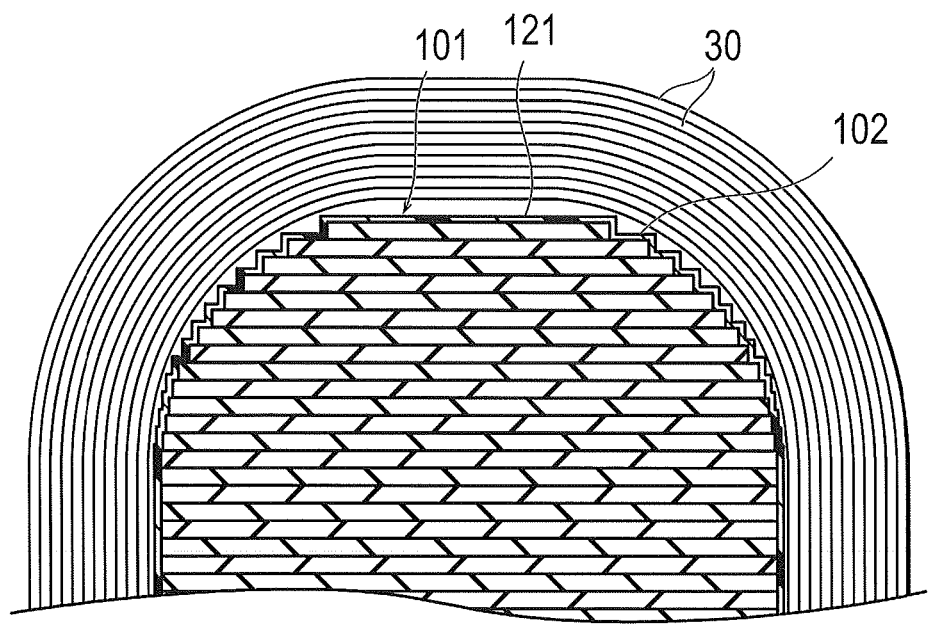
FIG. 9 is a sectional view illustrating a modified example of a stator around which an electric wire has been wound.

The present invention is not limited to the above-described embodiment, and can be modified in various manners within the scope of the claims. For example, as in a stator 101 that is a modified example illustrated in FIG. 9, the outside surface of the steel plates fixed to one another may be coated with an insulating layer 102. Even when the outside surface is coated with the insulating layer 102, since the angular portion is not formed at the location where the electric wire 30 of the tooth winding portions 121 is wound or the angular portion has the less angular, a coating thickness of the insulating layer can be minimized, high winding efficiency can be secured, a work time can be shortened, and the cost can be reduced.

The entire disclosure of Japanese Patent Application No. 2011-273260 filed Dec. 14, 2011 including specification, claims, drawings and summary are incorporated herein by reference in its entirety.

What is claimed is:
1. A stator comprising:
an annular part of an annular shape;

a tooth winding portion that protrudes in an inward direction from the annular part, and around which an electric wire is wound; and a tooth end portion formed on an inward side of the tooth winding portion, the stator being formed by a first plurality of steel plates in a stacking direction corresponding to a rotational axis of an electric motor, wherein the tooth winding portion is formed by the first plurality of steel plates and a second plurality of steel plates having shapes different from one another such that at an end portion of steel plates in the stacking direction, thicknesses of the tooth winding portions gradually decrease toward the end portion in the stacking direction, and the annular part and the tooth end portion each include a protruding portion formed by the first and second plurality of the steel plates such that the protruding portion protrudes from the tooth winding portion in the stacking direction;

wherein the protruding portion is formed by the first plurality of steel plates and the second plurality of the steel plates having shapes different from one another such that thickness of the protruding portion gradually decreases toward the end portion in the stacking direction.

2. The stator according to claim 1, wherein the steel plates used for the protruding portion includes an outside steel plate provided at the annular part, and an inside steel plate provided at the tooth end portion.

3. The stator of claim 1, wherein each of the first plurality of steel plates have an identical shape, and the second plurality of steel plates comprises a plurality of sets of pairs of top and bottom plates, each pair having an identical shape and each set of pairs having a different shape.

* * * * *